(12) United States Patent
Wendler et al.

(10) Patent No.: US 8,604,509 B2
(45) Date of Patent: Dec. 10, 2013

(54) FLEXIBLE PIXEL ELEMENT AND SIGNAL DISTRIBUTION MEANS

(75) Inventors: Brett David Wendler, Watertown, SD (US); Eric Steven Bravek, Brookings, SD (US); Erich J. Grebel, Amarillo, TX (US)

(73) Assignee: Daktronics, Inc., Brookings, SD (US)

( * ) Notice: Subject to any disclaimer, the term of this patent is extended or adjusted under 35 U.S.C. 154(b) by 0 days.

(21) Appl. No.: 13/609,647

(22) Filed: Sep. 11, 2012

(65) Prior Publication Data

US 2013/0002634 A1    Jan. 3, 2013

Related U.S. Application Data

(63) Continuation of application No. 11/895,423, filed on Aug. 24, 2007, now Pat. No. 8,334,410, which is a continuation-in-part of application No. 10/965,127, filed on Oct. 14, 2004, now abandoned.

(60) Provisional application No. 60/926,706, filed on Apr. 27, 2007.

(51) Int. Cl.
*H01L 33/00* (2010.01)

(52) U.S. Cl.
USPC .............................................. 257/99; 257/88

(58) Field of Classification Search
USPC .................... 257/88–103, E33.072, E33.059, 257/E33.057
See application file for complete search history.

(56) References Cited

U.S. PATENT DOCUMENTS

| | | | |
|---|---|---|---|
| 4,263,736 A | 4/1981 | Beierwaltes et al. | |
| 4,539,598 A | 9/1985 | Dietrich et al. | |
| 4,751,446 A | 6/1988 | Pineda et al. | |
| 4,839,726 A | 6/1989 | Balopole et al. | |
| 5,079,636 A | 1/1992 | Brody | |
| 5,151,689 A | 9/1992 | Kabuto et al. | |
| 5,164,853 A | 11/1992 | Shimazaki | |
| 5,168,375 A | 12/1992 | Reisch et al. | |
| 5,261,050 A | 11/1993 | Fox et al. | |
| 5,363,318 A | 11/1994 | McCauley | |
| 5,382,811 A | 1/1995 | Takahashi | |
| 5,399,390 A | 3/1995 | Akins | |

(Continued)

FOREIGN PATENT DOCUMENTS

| AU | 2003203350 A1 | 7/2003 |
|---|---|---|
| AU | 2005329700 B2 | 9/2006 |

(Continued)

OTHER PUBLICATIONS

U.S. Appl. No. 10/965,127, filed Oct. 14, 2004, Flexible Pixel Element and Signal Distribution Means.

(Continued)

*Primary Examiner* — Cuong Q Nguyen
(74) *Attorney, Agent, or Firm* — Schwegman, Lundberg & Woessner, P.A.

(57) ABSTRACT

Discreet flexible pixel elements connected in series comprise flexible pixel strings that are conformably applied to irregular shapes and surfaces thereby to produce free-form electronic displays and signage. Means for serial connection of discreet flexible pixel elements enable efficient power, data and control signal distribution. Image data conversion means translates conventional graphical image data into visual image data and control signals to drive discreet flexible pixel elements. The discreet flexible pixel element, serial connection means, and signal distribution means of the present invention enable efficient, economical production of large scale, free-form electronic displays, signs and lighting effects.

20 Claims, 7 Drawing Sheets

(56) References Cited

U.S. PATENT DOCUMENTS

| | | |
|---|---|---|
| 5,400,229 A | 3/1995 | Lin |
| 5,440,648 A | 8/1995 | Roberts et al. |
| 5,475,400 A | 12/1995 | Sellers et al. |
| 5,523,769 A | 6/1996 | Lauer et al. |
| 5,600,574 A | 2/1997 | Reitan |
| 5,642,125 A | 6/1997 | Silverstein et al. |
| 5,767,822 A | 6/1998 | Hiroshi |
| 5,796,376 A | 8/1998 | Banks |
| 5,805,117 A | 9/1998 | Mazurek et al. |
| 5,815,168 A | 9/1998 | May |
| 5,946,005 A | 8/1999 | Chiang |
| 5,949,483 A | 9/1999 | Fossum et al. |
| 5,949,581 A | 9/1999 | Kurtenbach et al. |
| 6,054,968 A | 4/2000 | De Matteo |
| 6,072,446 A | 6/2000 | Tokimoto |
| 6,169,632 B1 | 1/2001 | Kurtenbach et al. |
| 6,219,099 B1 | 4/2001 | Johnson et al. |
| 6,259,838 B1 | 7/2001 | Singh et al. |
| 6,265,984 B1 | 7/2001 | Molinaroli |
| 6,291,024 B1 | 9/2001 | Deroch et al. |
| 6,330,111 B1 | 12/2001 | Myers |
| 6,335,728 B1 | 1/2002 | Kida et al. |
| 6,362,801 B1 | 3/2002 | Yuhara |
| 6,400,340 B1 | 6/2002 | Nishida |
| 6,536,914 B2 | 3/2003 | Hoelen et al. |
| 6,538,375 B1 | 3/2003 | Duggal et al. |
| 6,566,824 B2 | 5/2003 | Panagotacos et al. |
| 6,628,258 B1 | 9/2003 | Nakamura |
| 6,639,574 B2 | 10/2003 | Scheibe |
| 6,729,054 B1 | 5/2004 | VanderTuin |
| 6,736,512 B2 | 5/2004 | Balogh |
| 6,809,390 B2 | 10/2004 | Toda et al. |
| 6,819,303 B1 | 11/2004 | Berger |
| 6,842,164 B2 | 1/2005 | Imajo et al. |
| 6,856,303 B2 | 2/2005 | Kowalewski |
| 6,888,304 B2 | 5/2005 | Sato |
| 7,049,983 B2 | 5/2006 | Azami et al. |
| 7,091,927 B1 | 8/2006 | Hagge et al. |
| 7,148,944 B2 | 12/2006 | Kinoshita et al. |
| 7,161,558 B1 | 1/2007 | Eidem et al. |
| 7,165,863 B1 | 1/2007 | Thomas et al. |
| 7,295,362 B2 | 11/2007 | Meisburger |
| 7,417,251 B2 | 8/2008 | Iketsu et al. |
| 7,443,028 B2 | 10/2008 | Satou et al. |
| 7,492,091 B2 | 2/2009 | Kharrazi-olsson et al. |
| 7,868,903 B2 | 1/2011 | Brett et al. |
| 7,893,948 B1 | 2/2011 | Mittan et al. |
| 8,001,455 B2 | 8/2011 | Gloege et al. |
| 8,106,923 B2 | 1/2012 | Mittan et al. |
| 8,344,410 B2 | 1/2013 | Wendler et al. |
| 8,363,038 B2 | 1/2013 | Mittan et al. |
| 2001/0015709 A1 | 8/2001 | Imajo et al. |
| 2001/0049893 A1 | 12/2001 | Maas et al. |
| 2002/0000576 A1 | 1/2002 | Inukai |
| 2002/0051356 A1 | 5/2002 | Takahashi et al. |
| 2002/0088984 A1 | 7/2002 | Toda et al. |
| 2002/0122134 A1 | 9/2002 | Kalua |
| 2002/0145392 A1 | 10/2002 | Hair et al. |
| 2003/0031032 A1 | 2/2003 | Wu et al. |
| 2003/0034497 A1 | 2/2003 | Yamazaki et al. |
| 2003/0057886 A1 | 3/2003 | Lys et al. |
| 2003/0067437 A1 | 4/2003 | McClintock et al. |
| 2003/0076281 A1 | 4/2003 | Morgan et al. |
| 2003/0209714 A1 | 11/2003 | Taskar et al. |
| 2004/0004827 A1 | 1/2004 | Guest |
| 2004/0041800 A1 | 3/2004 | Daniels |
| 2004/0043139 A1 | 3/2004 | Daniels |
| 2004/0080262 A1 | 4/2004 | Park et al. |
| 2004/0207581 A1 | 10/2004 | Miller |
| 2004/0235227 A1 | 11/2004 | Kawase |
| 2004/0239586 A1 | 12/2004 | Cok |
| 2004/0253896 A1 | 12/2004 | Yamazaki |
| 2005/0030321 A1 | 2/2005 | Anwar |
| 2005/0040962 A1 | 2/2005 | Funkhouser et al. |
| 2005/0046646 A1 | 3/2005 | Tobita |
| 2005/0064685 A1 | 3/2005 | Hayakawa |
| 2005/0194898 A1 | 9/2005 | Kharrazi-olsson et al. |
| 2005/0225976 A1 | 10/2005 | Zampini et al. |
| 2005/0236640 A1 | 10/2005 | Guenther et al. |
| 2006/0039142 A1 | 2/2006 | Temple |
| 2006/0063027 A1 | 3/2006 | Vestweber et al. |
| 2006/0221599 A1 | 10/2006 | Hornsby et al. |
| 2006/0284161 A1 | 12/2006 | Tokida |
| 2007/0099401 A1 | 5/2007 | Tanaka |
| 2007/0148793 A1 | 6/2007 | Yoshida |
| 2008/0225143 A1 | 9/2008 | Joffer et al. |
| 2009/0021497 A1 | 1/2009 | Wendler et al. |
| 2009/0021529 A1 | 1/2009 | Wendler et al. |
| 2009/0021532 A1 | 1/2009 | Gloege et al. |
| 2009/0024867 A1 | 1/2009 | Gloege et al. |
| 2009/0024929 A1 | 1/2009 | Gloege et al. |
| 2009/0184984 A1 | 7/2009 | Takahara |
| 2009/0195154 A1 | 8/2009 | Yamazaki et al. |
| 2010/0265277 A1 | 10/2010 | Takahara |
| 2010/0277401 A1 | 11/2010 | Takahara et al. |
| 2011/0102307 A1 | 5/2011 | Wendler et al. |
| 2011/0141139 A1 | 6/2011 | Mittan et al. |
| 2012/0005563 A1 | 1/2012 | Gloege et al. |
| 2012/0032159 A1 | 2/2012 | Yamazaki et al. |
| 2012/0120033 A1 | 5/2012 | Mittan et al. |
| 2013/0120395 A1 | 5/2013 | Mittan et al. |

FOREIGN PATENT DOCUMENTS

| | | |
|---|---|---|
| EP | 0390479 A2 | 10/1990 |
| EP | 1655712 A2 | 5/2006 |
| GB | 2164189 | 3/1986 |
| GB | 2164189 A | 3/1986 |
| JP | 11191494 | 7/1999 |
| JP | 2005224983 A2 | 8/2005 |
| WO | WO-02073298 A2 | 9/2002 |
| WO | WO-02122134 A1 | 9/2002 |
| WO | WO-03060857 A1 | 7/2003 |

OTHER PUBLICATIONS

U.S. Appl. No. 10/965,127, filed Oct. 14, 2004, Flexible Pixel String Software and Method.

U.S. Appl. No. 60/808,200, filed May 24, 2006, Translation Table.

U.S. Appl. No. 13/172,102, filed Jun. 29, 2011, Graphical Data Translation Table.

U.S. Appl. No. 60/926,706, filed Apr. 27, 2007, Flexible Pixel Assemblies for Mounting on Irregular Surfaces.

U.S. Appl. No. 11/895,423, filed Aug. 24, 2007, Flexible Pixel Element and Signal Distribution Means.

U.S. Appl. No. 12/987,584, filed Jan. 10, 2011, Sealed Pixel Assemblies, Kits and Methods.

U.S. Appl. No. 13/360,187, filed Jan. 27, 2012, Flexible Pixel Hardware and Method.

"3-channel constant-current LED Driver with PWM control", (A6280-DS, Rev. 3), Allegro Microsystems Inc, [online]. [archived May 7, 2007]. Retrieved from the Internet:<URL:http://web.archive.org/web/20070507171052/http://www.allegromicro.com/en/Products/Part_Numbers/6280/6280>, (May 7, 2007), 12 pgs.

"U.S. Appl. No. 10/965,133, Final Office Action mailed Nov. 17, 2009", 9 pgs.

"U.S. Appl. No. 10/965,133, Non Final Office Action mailed May 25, 2010", 10 pgs.

"U.S. Appl. No. 10/965,133, Non Final Office Action mailed Jun. 2, 2008", 5 pgs.

"U.S. Appl. No. 10/965,133, Non Final Office Action mailed Jul. 10, 2006", 5 pgs.

"U.S. Appl. No. 10/965,133, Non Final Office Action mailed Oct. 26, 2007", 6 pgs.

"U.S. Appl. No. 10/965,133, Notice of Allowance mailed Oct. 18, 2010", 7 pgs.

"U.S. Appl. No. 10/965,133, Response filed Jan. 10, 2007 to Non Final Office Action mailed Jul. 10, 2006", 9 pgs.

"U.S. Appl. No. 10/965,133, Response filed Feb. 14, 2008 to Non Final Office Action mailed Oct. 26, 2007", 16 pgs.

(56) References Cited

OTHER PUBLICATIONS

"U.S. Appl. No. 10/965,133, Response filed May 17, 2010 to Final Office Action mailed Nov. 17, 2009", 11 pgs.
"U.S. Appl. No. 10/965,133, Response filed Jun. 2, 2009 to Non Final Office Action mailed Jun. 2, 2008", 13 pgs.
"U.S. Appl. No. 10/965,133, Response filed Aug. 25, 2010 to Non Final Office Action mailed May 25, 2010", 8 pgs.
"U.S. Appl. No. 11/805,513, Advisory Action mailed Mar. 22, 2011", 3 pgs.
"U.S. Appl. No. 11/805,513, Final Office Action mailed Dec. 28, 2010", 11 pgs.
"U.S. Appl. No. 11/805,513, Non-Final Office Action mailed Apr. 28, 2010", 10 pgs.
"U.S. Appl. No. 11/805,513, Notice of Allowance mailed Apr. 6, 2011", 9 pgs.
"U.S. Appl. No. 11/805,513, Response filed Feb. 28, 2011 to Final Office Action mailed Dec. 28, 2010", 9 pgs.
"U.S. Appl. No. 11/805,513, Response filed Mar. 28, 2011 to Final Office Action mailed Dec. 28, 2010", 6 pgs.
"U.S. Appl. No. 11/805,513, Response filed Sep. 28, 2010 to Non Final Office Action mailed Apr. 28, 2010", 6 pgs.
"U.S. Appl. No. 11/895,423, Notice of Allowance mailed May 9, 2012", 7 pgs.
"U.S. Appl. No. 11/895,423, Response filed May 2, 2012 to Restriction Requirement mailed Apr. 2, 2012", 17 pgs.
"U.S. Appl. No. 11/895,423, Restriction Requirement mailed Apr. 2, 2012", 5 pgs.
"U.S. Appl. No. 11/895,424, Non Final Office Action mailed Mar. 12, 2010", 6 pgs.
"U.S. Appl. No. 11/895,424, Notice of Allowance mailed Sep. 10, 2010", 13 pgs.
"U.S. Appl. No. 11/895,424, Response filed Jun. 11, 2010 to Non Final Office Action mailed Mar. 12, 2010", 8 pgs.
"U.S. Appl. No. 12/987,584, Non Final Office Action mailed Jun. 6, 2012", 19 pgs.
"U.S. Appl. No. 13/031,400 , Response filed Jul. 13, 2011 to Non Final Office Action mailed Apr. 14, 2011", 12 pgs.
"U.S. Appl. No. 13/031,400, Non Final Office Action mailed Apr. 14, 2011", 18 pgs.
"U.S. Appl. No. 13/031,400, Notice of Allowance mailed Sep. 23, 2011", 7 pgs.
"U.S. Appl. No. 13/360,187, Non Final Office Action mailed Jun. 15, 2012", 20 pgs.
"U.S. Appl. No. 13/360,187, Response filed Sep. 4, 2012 to Non Final Office Action mailed Jun. 15, 2012", 19 pgs.
"U.S. Appl. No. 13/360,187, Response to Non-Final Office Action filed Sep. 4, 2012", (Sep. 4, 2012), 20 pgs.
"European Application Ser. No. 08795482.2, Office Action mailed Feb. 21, 2012", 27 pgs.
"European Application Ser. No. 05256403.6, European Search Report mailed Oct. 5, 2006", 12 pgs.
"European Application Ser. No. 05256403.6, Partial European Search Report dated Jun. 20, 2006", 4 pgs.
"European Application Ser. No. 08165441.0, European Search Report dated Mar. 16, 2009", 5 pgs.
"European Application Ser. No. 08165441.0, Response filed Sep. 27, 2010, Office Action Jan. 27, 2012", 20 pgs.
"European Application Ser. No. 08795477.2, Amended Claims filed May 6, 2010", 5 pgs.
"European Application Ser. No. 08795477.2, Office Action mailed Mar. 31, 2010", 1 pg.
"European Application Ser. No. 08795477.2, Office Action mailed Jul. 2, 2012", 6 pgs.
"European Application Ser. No. 08795482.2, Examination Report mailed Sep. 13, 2011", 12 pgs.
"European Application Ser. No. 08795482.2, Extended European Search Report mailed Jan. 19, 2011", 12 pgs.
"European Application Ser. No. 08795482.2, Response filed Jan. 4, 2012 to Office Action mailed Sep. 13, 2011", 12 pgs.
"European Application Ser. No. 08795482.2, Response filed Aug. 2, 2011 to Communication dated Feb. 7, 2011", 14 pgs.
"European Application Ser. No. 09250303.6, European Search Report mailed Mar. 16, 2009", 5 pgs.
"European Application Ser. No. 08795477.2, Response filed Aug. 31, 2011 to Supplementary European Search Report mailed Apr. 18, 2011", 11 pgs.
"European Application Ser. No. 08795477.2, Supplementary European Search Report mailed Apr. 18, 2011", 7 pgs.
"International Application Ser. No. PCT/US08/09936, International Preliminary Report on Patentability mailed Aug. 24, 2010", 6 pgs.
"International Application Ser. No. PCT/US08/09936, International Search Report mailed Nov. 10, 2008", 1 pg.
"International Application Ser. No. PCT/US08/09936, Written Opinion mailed Nov. 10, 2008", 3 pgs.
"International Application Ser. No. PCT/US08/09941, International Search Report mailed Nov. 17, 2008", 1 pg.
"International Application Ser. No. PCT/US08/09941, Written Opinion mailed Nov. 17, 2008", 6 pgs.
Baumann, P., "Management of Multidimensional Discrete Data", VLDB Journal, 3, (May 1994), 401-444.
Matkovic, K., "Tone Mapping Techniques and Color Image Difference in Global Illumination", Dissertation, (Feb. 18, 1998), 128 pgs.
Schwesig, C., et al., "Gummi: A Bendable Computer", Proceedings of the SIGCHI conference on Human factors in computing systems CHI '04, (Apr. 2004), 263-270.
Van Baar, J., et al., "Seamless Multi-Projector Display on Curved Screens", Proceedings of the Workshop on Virtual Environments 2003 EGVE '03, (May 2003), 281-286.
"U.S. Appl. No. 11/895,423, Amendment filed Dec. 12, 2012", 29 pgs.
"U.S. Appl. No. 12/987,584, Advisory Action mailed Dec. 21, 2012", 2 pgs.
"U.S. Appl. No. 12/987,584, Final Office Action mailed Oct. 12, 2012", 21 pgs.
"U.S. Appl. No. 12/987,584, Preliminary Amendment filed Feb. 28, 2011", 7 pgs.
"U.S. Appl. No. 12/987,584, Response filed Jan. 9, 2013 to Final Office Action mailed Oct. 12, 2012 and Advisory Action mailed Dec. 21, 2012", 12 pgs.
"U.S. Appl. No. 12/987,584, Response filed Sep. 6, 2012 to Non Final Office Action mailed Jun. 6, 2012", 12 pgs.
"U.S. Appl. No. 12/987,584, Response filed Dec. 12, 2012 to Final Office Action mailed Oct. 12, 2012", 12 pgs.
"U.S. Appl. No. 13/360,187, Notice of Allowance mailed Sep. 17, 2012", 7 pgs.
"European Application Ser. No. 08795477.2, Response filed Nov. 2, 2012 to Office Action mailed Jul. 2, 2012", 12 pgs.
U.S. Appl. No. 13/732,510, filed Jan. 2, 2013, Flexible Pixel Hardware and Method.

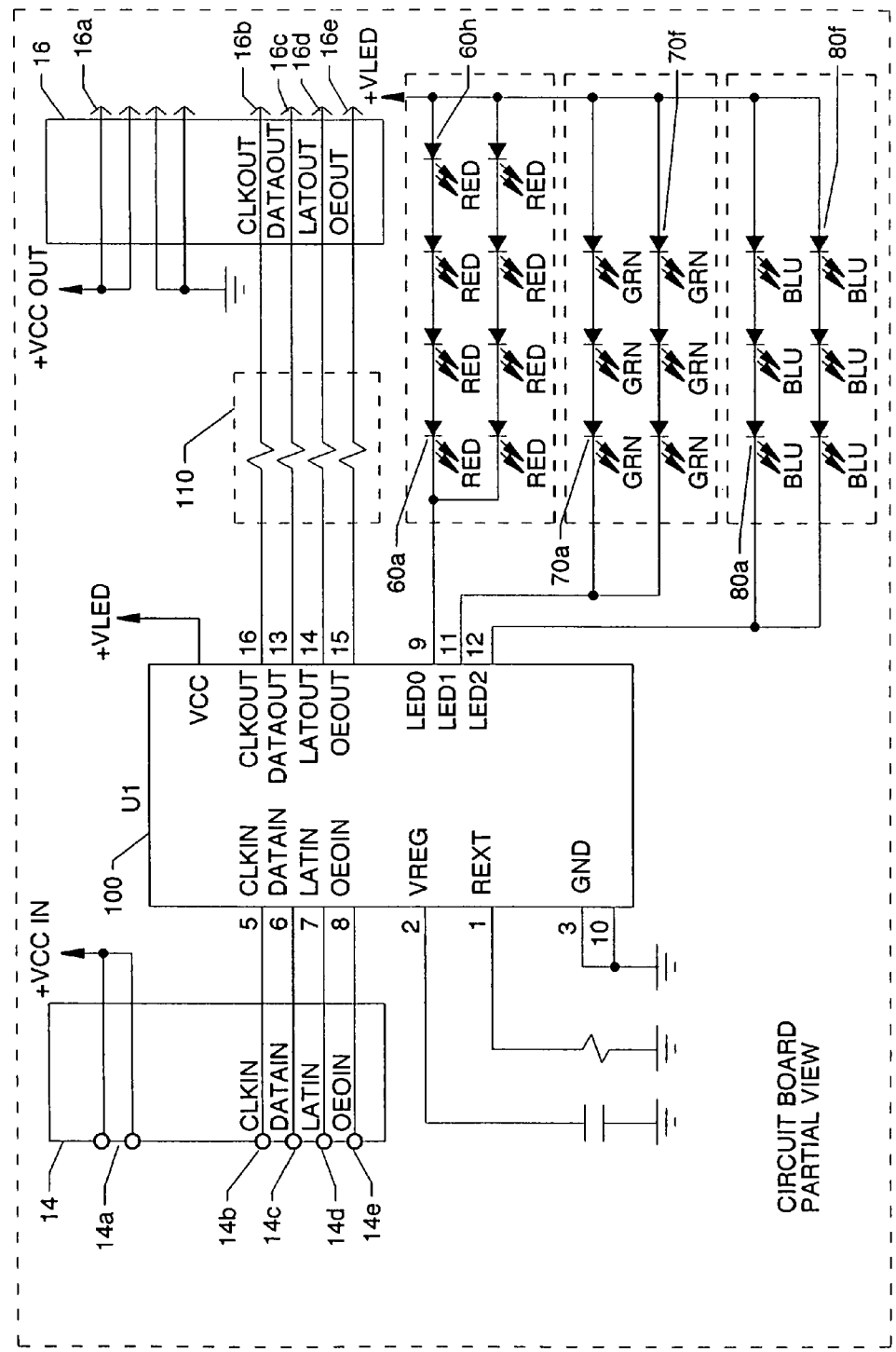
FIG. 4-A

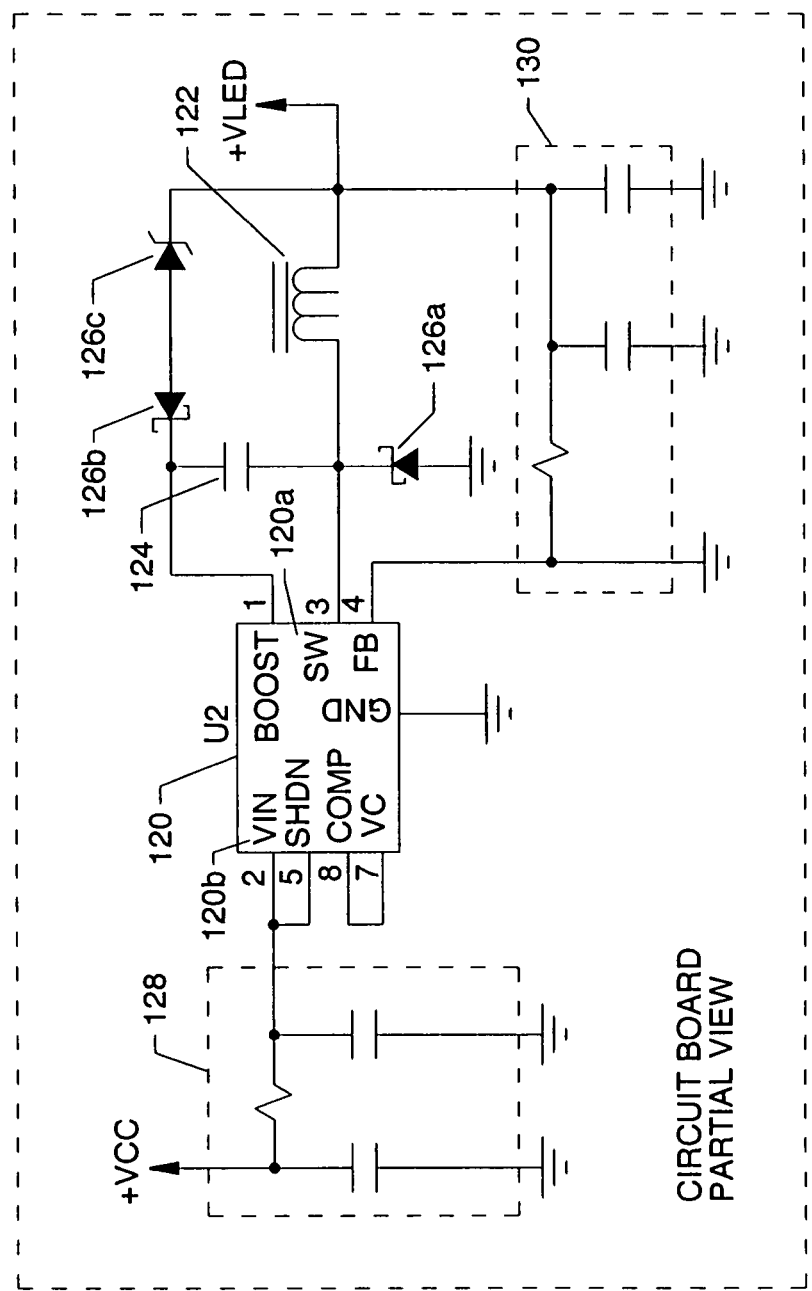
FIG. 4-B

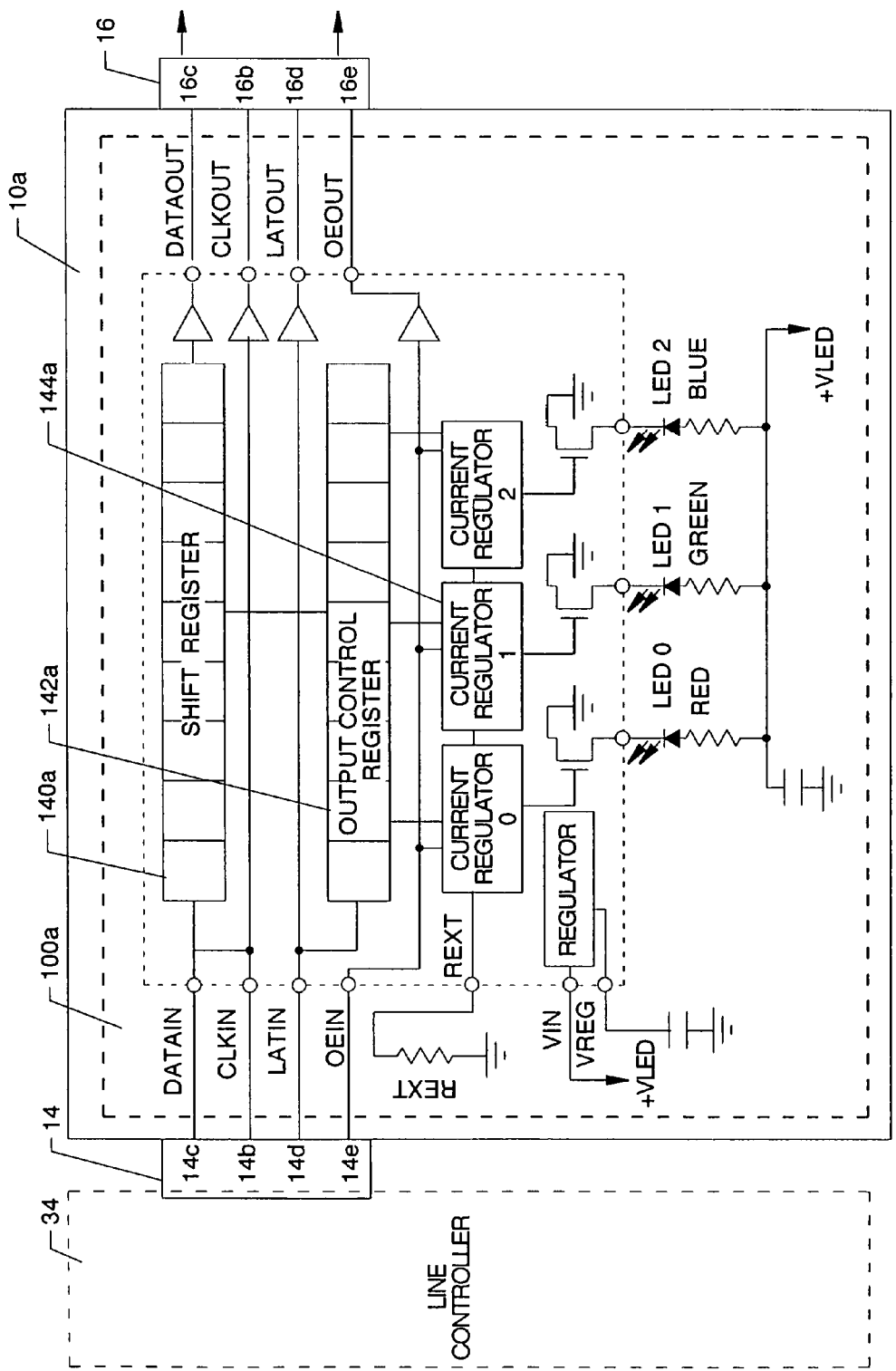
FIG. 5-A

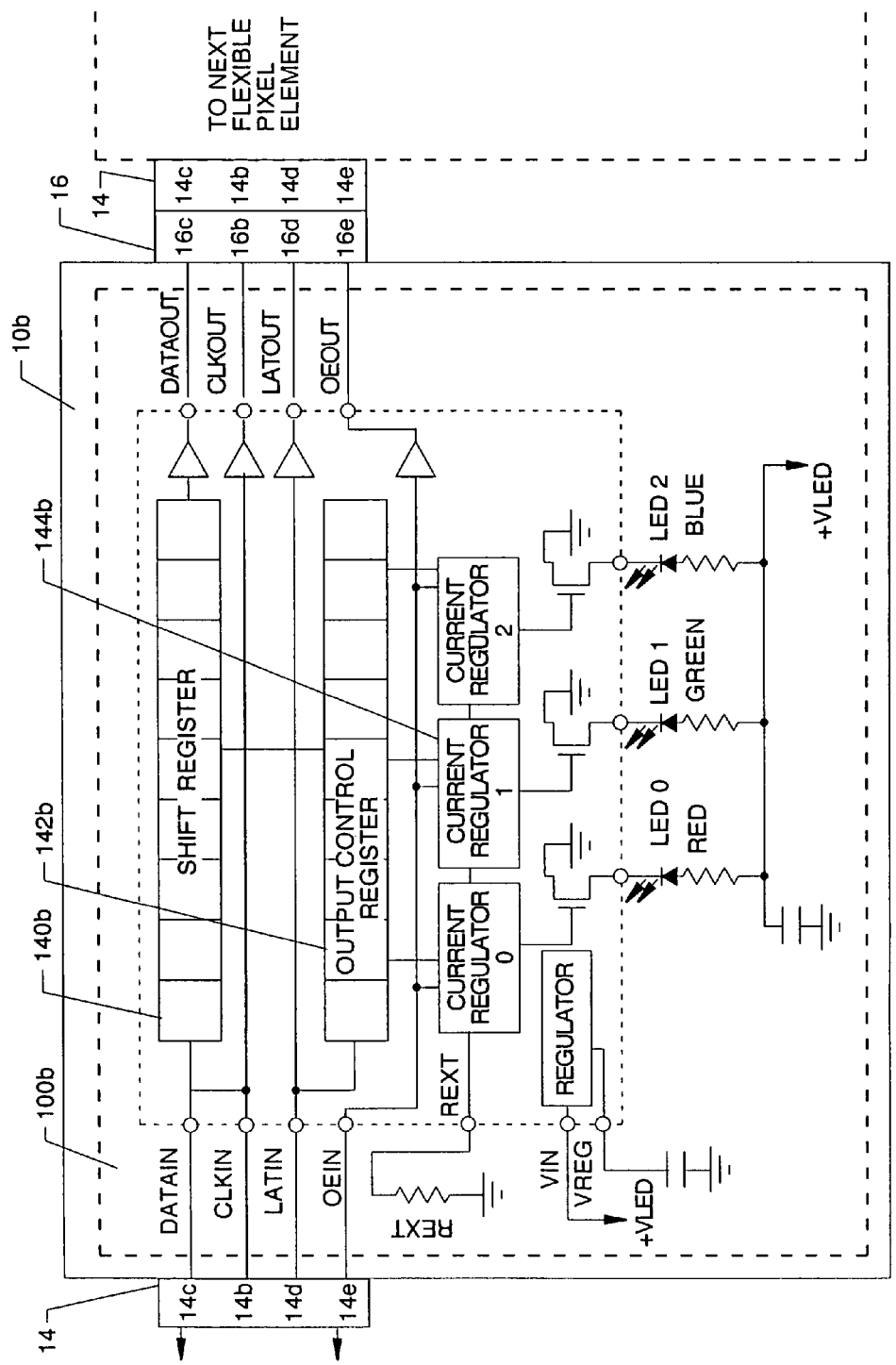
FIG. 5-B

FLEXIBLE PIXEL ELEMENT AND SIGNAL DISTRIBUTION MEANS

CROSS REFERENCES TO RELATED APPLICATIONS

This application is a continuation of and claims the benefit of priority under 35 U.S.C. §120 to U.S. patent application Ser. No. 11/895,423, filed on Aug. 24, 2007, entitled "Flexible Pixel Element and Signal Distribution Means," which is a continuation-in-part of U.S. patent application Ser. No. 10/965,127 filed on Oct. 14, 2004, entitled "Flexible Pixel String Software and Method" (now abandoned), the benefit of priority of each of which is claimed hereby, and each of which are incorporated by reference herein in their entirety.

U.S. patent application Ser. No. 11/895,423, filed on Aug. 24, 2007, entitled "Flexible Pixel Element and Signal Distribution Means," also claims the benefit of priority to U.S. Provisional Patent Application Ser. No. 60/926,706 filed Apr. 27, 2007, entitled "Flexible Pixel Assemblies for Mounting on Irregular Surfaces," and is hereby incorporated by reference herein in its entirety.

U.S. patent application Ser. No. 11/895,423 is related to U.S. patent application Ser. No. 10/965,133, filed on Oct. 14, 2004, entitled "Flexible Pixel String Hardware and Method," which issued as U.S. Pat. No. 7,893,948 on Feb. 22, 2011, which is incorporated by reference herein in its entirety U.S. patent application Ser. No. 11/895,423 is also related to U.S. patent application Ser. No. 11/895,424 filed on Aug. 24, 2007, entitled "Flexible Pixel Element Fabrication and Sealing Method," which issued as U.S. Pat. No. 7,868,903, which is incorporated by reference herein in its entirety.

BACKGROUND OF THE INVENTION

1. Field of the Invention

The present invention teaches a discreet flexible pixel element for use in flexible pixel strings, a connection means for serially connecting a plurality of discreet flexible pixel elements into flexible pixel strings, and a distribution means for distributing operating power, image data and control signals to a flexible pixel string, thereby to produce visual display images and lighting effects for viewing by a viewing party or public. Flexible pixel strings may be used in electronic display devices and signage and, more particularly, in non-rectilinear, non-planar electronic display devices having irregular shapes and surface features. Electronic displays having irregular shapes or surface features include channel letter displays, free-form logo and design displays; curved, round and cylindrical displays, and the like. Displays of this type often are mounted on large area surfaces, such as the interior or exterior of buildings, where the intent is to complement the surface architecture of the building by conforming to the building surfaces. The discreet flexible pixel element, connection means, and signal distribution means of the present invention enable efficient, economical production of large scale, direct view electronic displays, signage and lighting effects that are not restricted to rectilinear and planar configuration, but may freely conform to irregular shapes and surfaces.

2. Description of the Prior Art

Electronic display devices and electronic signage are known in the art. An electronic display device typically comprises a display board that produces visual images by means of a grid of small light-emitting elements such as incandescent bulbs, LEDs, or the like; data handling and control means for managing transfer of digital image data for display as visual images, and means for converting digital image data into visual image data and display control signals to drive light-emitting elements or pixels to produce visual images on an electronic display board for viewing.

The graphical content that can be displayed on electronic display devices is technology-dependent and generally limited by the light-emitting elements used to produce visual images. Early prior art electronic display devices consisted of a matrix or grid of small light-emitting elements, such as incandescent bulbs, which were turned on and off in simple patterns to produce text messages and primitive graphic images for viewing. Continuing improvements in the art have produced electronic display devices that are increasingly larger in scale and more powerful with respect to the size, complexity and sophistication of visual images that can be displayed. Light-emitting display technology also has become increasingly more sophisticated, progressing from monochrome incandescent and LED devices to video quality components capable of producing near continuous-tone graphical output, dynamic combinations of text and images, complex animations, recorded video sequences and live video streams.

Electronic display devices of irregular shape also are known in the art. One popular type of irregular shape electronic display device is channel letter signage, where large block letters with internal channels are fitted with light-emitting elements to produce signage and lighting effects. Depending on the type of light-emitting elements used, as well as the capabilities of the control means employed, early prior art channel letter signs were capable of producing simple dynamic graphical effects such as flashing, rippling, scrolling and the like. The prior art provides for channel letter signs that can display video quality images and a variety of dynamic lighting effects.

The construction of prior art irregular shape electronic display devices, including channel letter signage, is typically accomplished using conventional rectangular-grid video components. However, such use of rectangular-grid video components is inelegant and wasteful in implementation, while the end result often lacks the desired effect that shaped video components can provide. Moreover, rectangular-grid video components and control system means are inadequate for creating the type of custom shaped electronic display devices that are becoming increasingly popular. Custom shaped electronic displays may be non-rectilinear and non-planar (e.g., circular, cylindrical and spherical displays), making the use of rectangular-grid video components to produce custom shaped electronic displays difficult to execute and expensive to produce. However, electronic display devices and signage that use rectangular-grid video components are more easily repaired than those that use shaped video components, since rectangular-grid video components are easily replaced when they fail or are damaged, while shaped video components must be re-fabricated to match the failed or damaged components.

Additional problems in the prior art result from limitations of technology used to distribute signals, such as operating power, image data and display control signals, to pixel elements ganged together in large scale displays and signage. In the prior art, pixel element driving circuits, such as LED drivers, typically reside on one or more off-board printed circuit boards (PCBs) within a remotely located display controller. Distribution of operating power, image data, and display control signals to the pixel elements is accomplished by means of lengthy power and signal cables. This means of supplying pixel elements with operating power, image data and control signals incurs several disadvantages. First, power loss and signal degradation across long run lengths of conductors limits the distance the off-board pixel element driver PCBs can reside from the pixel elements they drive, thus limiting the size of the electronic display device to the maximum conductor run length and restricting optimal placement of remote display controllers. Second, limitations on the number of pixel elements that can be serviced by a single driver PCB requires the use of multiple driver PCBs to service a large plurality of pixel elements embodied within large scale electronic displays and signage. Third, the use of multiple driver PCBs requires the concomitant use of expensive power and signal cables to service the pixel elements. Finally, the multiplicity of driver PCBs, power cables and signal cables, in addition to the large plurality of pixel elements inherent in the design of large scale electronic display devices and signage, creates a vulnerable design architecture having complex wiring with many connection points and potential points of failure. Moreover, while the prior art provides for serial-connection of pixel elements in electronic display devices and signage, the data transmission distance between pixel elements is limited to short distances and still requires a large number of power and signal conductors to transmit operating power, image data and control signals between pixel elements.

Another problem inherent in the prior art is means and methods to protect a vulnerable design architecture having many potential points of failure and delicate electronic components, such as pixel elements and drivers, from failure due to harsh environmental conditions and inclement weather, a particular problem with outdoor or exterior electronic displays and signage. In the prior art, pixel elements are collectively sealed in protective enclosures to protect them from the elements. Not only does this add to the cost of already expensive large scale exterior electronic displays and signage, but producing enclosures that conform to irregular shaped surfaces can be a complex and costly undertaking. Moreover, such an enclosure constitutes a single failure point, wherein any failure of the enclosure exposes all the connection points and delicate electronic components contained therein to potential failure. Finally, collective enclosures are subject to over-heating from both internal and external sources including component power dissipation and solar radiation.

A solution to these and other problems is taught in patent application Ser. No. 10/965,133 filed on Oct. 14, 2004, entitled "Flexible Pixel String Hardware and Method," pending, which teaches the use of flexible pixel strings that can be conformably applied to fit irregular shapes surfaces, including non-rectilinear and non-planar shapes and surfaces, such as channel letter displays, and is hereby incorporated into this application by reference as if fully set forth herein. A portion of that teaching is the use of a plurality of discreet flexible pixel elements that can be connected in series by means of flexible connectors and wiring to produce a flexible pixel string that is conformable to irregular shapes and surfaces.

The present invention discloses further teaching of means and methods operative and efficacious in producing the aforesaid discreet flexible pixel elements, including means of connecting said discreet flexible pixel elements in series-connection to embody flexible pixel strings. The present invention also teaches signal distribution means to supply operating power, image data, and display control signals to discreet flexible pixel elements embodied within flexible pixel strings.

In summation, the prior art is generally dependent on conventional means, such as rectangular-grid video components, to produce electronic display devices and signage having advanced graphical capabilities that also can conform to irregular shapes and surfaces. As a result, design and production of such devices are slow and inefficient, production costs are prohibitive, and outcomes are often inelegant and failure prone. Clearly, a novel approach to address the aforesaid deficiencies of the prior art is needed to continue to satisfy public demand and thereby ensure continuing development of the art.

SUMMARY OF THE INVENTION

The general purpose of the present invention is to provide direct view, large scale electronic display devices and signage having advanced graphical capabilities that can conform to irregular shapes and surfaces. More specifically, the present invention embodies a discreet flexible pixel element that can be interchangeably connected in series with a plurality of like discreet flexible pixel elements to embody a flexible pixel string. Said discreet flexible pixel element may embody a single light-emitting element, such as a solitary LED or incandescent bulb, or may embody a plurality of light-emitting elements, such as a plurality of red-green-blue (RGB) LEDs electronically connected within said discreet flexible pixel element.

Said flexible pixel string may be one of a plurality of interchangeable flexible pixel strings that comprise a flexible pixel string array. Said flexible pixel strings and said flexible pixel string arrays can be applied conformably to irregular shaped and non-planar surfaces thereby to produce direct view, large scale, electronic display devices and dynamic electronic signage and lighting effects such as visual displays, architectural lighting, color effects lighting, channel letter lighting, and similar such applications. Said large scale electronic display devices, dynamic electronic signage and lighting effects may be applied to interior and exterior surfaces of buildings, large conveyances and transport vehicles such as ships and trucks, and similar large area surfaces.

According to one embodiment of the present invention there is provided a discreet flexible pixel element having at least one and preferably a plurality of on-board light-emitting elements or pixels. In a preferred embodiment of the present invention, said on-board light-emitting elements or pixels of said discreet flexible pixel element comprise a plurality of red, green and blue LED light-emitting pixel elements.

According to another embodiment of the present invention, there is provided a discreet flexible pixel element having at least one and preferably a plurality of on-board pixel element drivers for driving said on-board light-emitting pixel elements. In a preferred embodiment of the present invention, said on-board pixel element drivers for driving said on-board light-emitting pixel elements of said discreet flexible pixel element comprise a plurality of constant-drive LED current drivers that drive a plurality of red, green and blue LED light-emitting LED pixel elements.

According to still another embodiment of the present invention, a plurality of said discreet flexible pixel elements are connected in series to comprise a flexible pixel string. In a preferred embodiment of the present invention, a plurality of said flexible pixel strings are apportioned into operative groups to comprise flexible pixel string arrays, wherein each said flexible pixel string array embodying said plurality of flexible pixel strings is driven by a line controller.

According to yet another embodiment of the present invention, said discreet flexible pixel element comprises a non-unique, non-addressed, self-contained unit that is fully interchangeable with any other like unit. In a preferred embodiment of the present invention, each said interchangeable discreet flexible pixel element has a single input connector having at least four input signal conductors and a single output connector having at least four output signal conductors, wherein the output connector of any given discreet flexible pixel element can be operatively fitted and connected to the input connector of any other given discreet flexible pixel element thereby operatively to establish series connection.

According to still another embodiment of the present invention, a plurality of said flexible pixel strings can be conformably applied to, or mounted on, irregular shapes and surfaces including non-rectilinear and non-planar surfaces such as channel letter displays, pillars, curved walls and the like to produce large scale electronic display devices and dynamic electronic signage and light effects.

According to still another embodiment of the present invention, there is provided a display controller that operatively controls said discreet flexible pixel elements, and thereby said flexible pixel strings, to drive a plurality of light-emitting elements therein such as RGB LEDs, thereby to produce visual display output including light-generated images and lighting effects from electronic display devices and signage. In a preferred embodiment of the present invention, said display controller embodies a signal distribution means whereby operating power, image data and control signals are operatively transmitted to a plurality of said discreet flexible pixel elements serially-connected by means of flexible cables or conductors.

According to yet another embodiment of the present invention, said display controller embodies image data conversion means that converts conventional graphical image data created for matrix-grid type, rectilinear or planar electronic display devices into visual image data and control signals corresponding to logical and spatial placement and position of said discreet flexible pixel elements embodied within said flexible pixel strings conformably applied to irregular shapes and surfaces.

A significant aspect and feature of the present invention is that a plurality of discreet flexible pixel elements may be interchangeably connected in series to embody flexible pixel strings. Advantageously, said flexible pixel string requires only a single line driver to supply power and signal requirements to service said plurality of series-connected discreet flexible pixel elements comprising said flexible pixel string and the light-emitting pixel elements therein.

Another significant aspect and feature of the present invention is that said flexible pixel strings can be apportioned into operative groups of flexible pixel string arrays. Advantageously, each said flexible pixel string array can be driven by a remote line controller embodying a plurality of line drivers corresponding to the number of flexible pixel strings contained within said flexible pixel string array, thus allowing greater design freedom to conformably apply said flexible pixel string arrays to irregular shapes and surfaces such as channel letter displays and the like.

Yet another significant aspect and feature of the present invention is that flexible pixel strings and flexible pixel string arrays can be conformably applied to, or mounted on, irregular shape and non-planar surfaces, thereby advantageously to produce large scale electronic display devices, dynamic electronic signage and lighting effects efficiently and economically.

Yet another significant aspect and feature of the present invention is that each discreet flexible pixel element embodies on-board light-emitting pixel elements and on-board pixel element drivers, advantageously reducing some of the limitations of off-board pixel element drivers such as power loss and signal degradation and enabling means to produce discreet, interchangeable flexible pixel elements.

Yet another significant aspect and feature of the present invention is that each discreet flexible pixel element embodies one input connecter with one input power conductor and no more than four input data and control signal conductors and one output connector with one output power conductor and no more than four output data and control signal conductors, thereby advantageously to reduce the number of connectors and conductors to the minimum required to operatively provision series-connected discreet flexible pixel elements with operating power, image data and control signals.

A further significant aspect and feature of the present invention is that each discreet flexible pixel element comprises a non-unique, self-contained unit that is fully interchangeable with any other like unit. Advantageously, any given discreet flexible pixel element is easily replaced with any other like discreet flexible pixel element when necessary due to damage or failure, since the signal distribution means of the present invention obviates any requirement for unique configuration, identification or addressing of said discreet flexible pixel elements. Also advantageously, said discreet flexible pixel elements can be replaced while power to the electronic display device or electronic sign is maintained.

Yet a further significant aspect and feature of the present invention is a display controller that embodies signal distribution means whereby operating power, image data and display control signals are transmitted serially to a plurality of said discreet flexible pixel elements connected in series by means of flexible cables embodying one input connector having one input power conductor and no more than four input signal conductors and one output connector having one output power conductor and no more than four output signal conductors, thus advantageously reducing the number of electrical connections, the length of power and signal cables, and the number of conductors needed to operatively supply said discreet flexible pixel elements and the light-emitting pixel elements therein with operating power, image data and control signals, thereby reducing the number of potential failure points.

Yet a further significant aspect and feature of the present invention is a display controller that embodies an image data translator and pixel array configuration table that convert conventional graphical image data created for use with matrix-grid, rectilinear and planar electronic displays into visual image data and display control signals corresponding to irregular shape, non-rectilinear and non-planar electronic display devices that embody said discreet flexible pixel elements, thereby advantageously to supply said discreet flexible pixel elements with requisite visual image data and display control signals. Also advantageously, said image data translator and pixel array configuration table eliminate any requirement for addressing or configuration means to uniquely identify placement or position of said discreet flexible pixel elements.

Having thus described embodiments of the present invention and set forth significant aspects and features of the present invention, it is the principal object of the present invention to provide a discreet flexible pixel element, a connection means for connecting a plurality of said discreet flexible pixel elements in series to embody flexible pixel strings, a conversion means to convert graphical image data from a rectilinear, planar format to visual image data corresponding to the logical and spatial positions of a plurality of said discreet flexible pixel elements within a plurality of said flexible pixel strings conformably applied to irregular shapes and surfaces, and a signal distribution means for transmitting said converted visual image data, operating power and control signal to said discreet flexible pixel elements within said flexible pixel strings, thereby to produce visual display images and lighting effects for viewing by a viewing party or public.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 4-A is a simplified circuit diagram depicting various electrical components and circuit connections of the discreet flexible pixel element of the present invention;

FIG. 4-B is a continuation of the simplified circuit diagram of FIG. 4-A depicting additional electrical components and circuit connections of the discreet flexible pixel element of the present invention; and, FIGS. 5-A and 5-B are a simplified connection diagram depicting series-connection of a plurality of discreet flexible pixel elements and signal paths between functional components thereof.

DETAILED DESCRIPTION OF THE PREFERRED EMBODIMENTS

Figure 1:
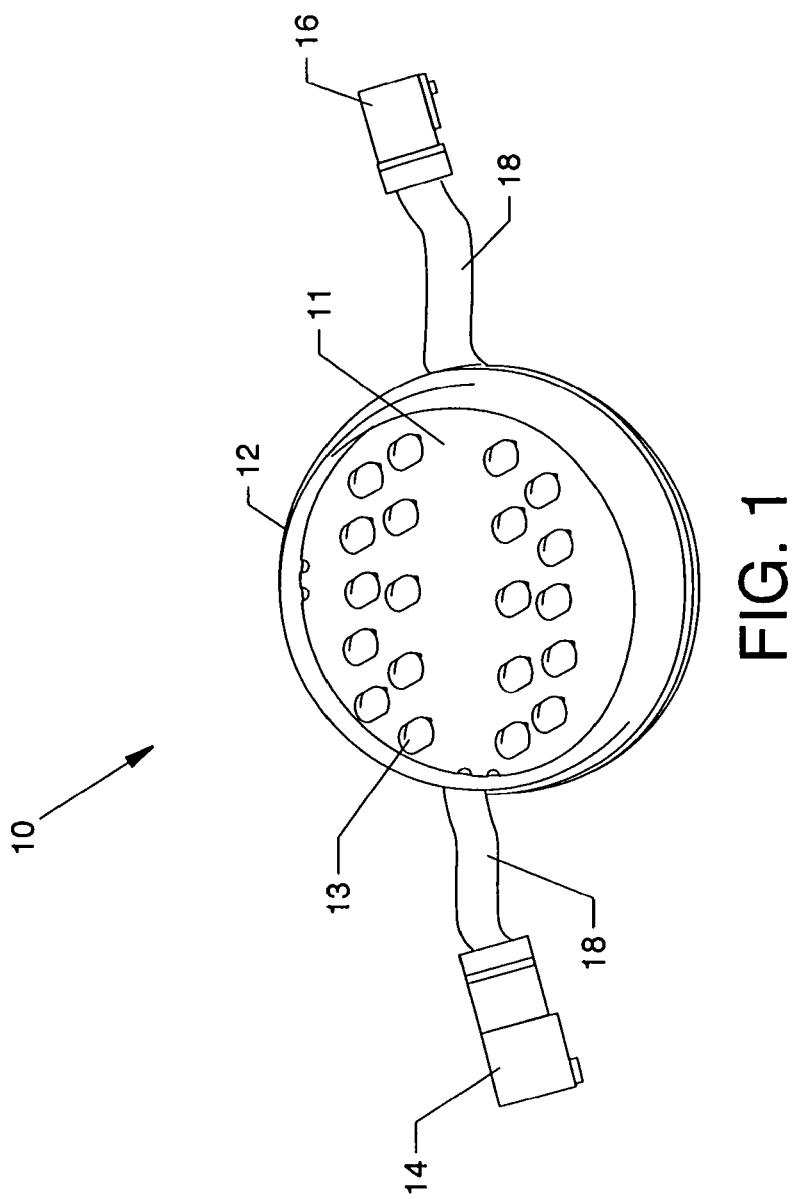
FIG. 1 is an isometric view of the interchangeable discreet flexible pixel element of the present invention.

FIG. 1 is an isometric view of a preferred embodiment of discreet flexible pixel element 10 of the present invention. Discreet flexible pixel element 10 embodies a printed circuit board 11, on which various electrical components (described hereinafter) are mechanically joined by operative electrical connection, a plurality of light-emitting elements 13 hermetically sealed within case 12, input connector 14, output connector 16 and flexible cables 18. Light-emitting elements 13 illuminate when energized by on-board element drivers (not shown) to produce visual output in the form of emitted light. In a preferred embodiment, light-emitting elements 13 comprise a plurality of red, green and blue (RGB) colored LEDs.

Figure 2:
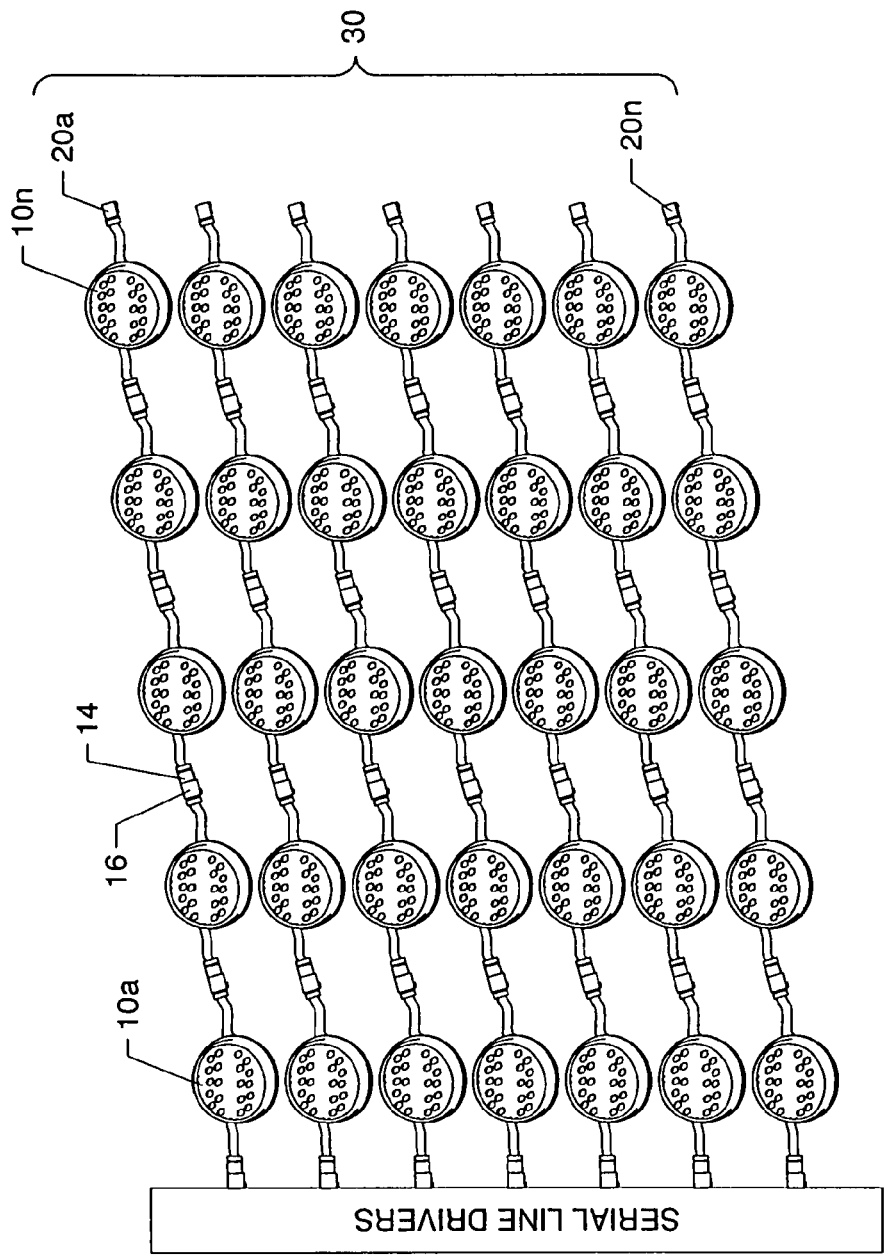
FIG. 2 is a simplified connection diagram depicting a plurality of discreet flexible pixel elements in series-connection to embody flexible pixel strings apportioned into operative groups to embody flexible pixel string arrays.

FIG. 2 is a simplified connection diagram depicting a plurality of discreet flexible pixel elements 10a-10n connected in series to embody flexible pixel string 20a, wherein output connector 16 of a given discreet flexible pixel element 10 is operatively joined in series-connection to input connector 14 of the next discreet flexible pixel element 10 of flexible pixel string 20a. FIG. 2 further depicts an operative grouping of flexible pixel strings 20a-20n apportioned to embody a flexible pixel string array 30.

Figure 3:
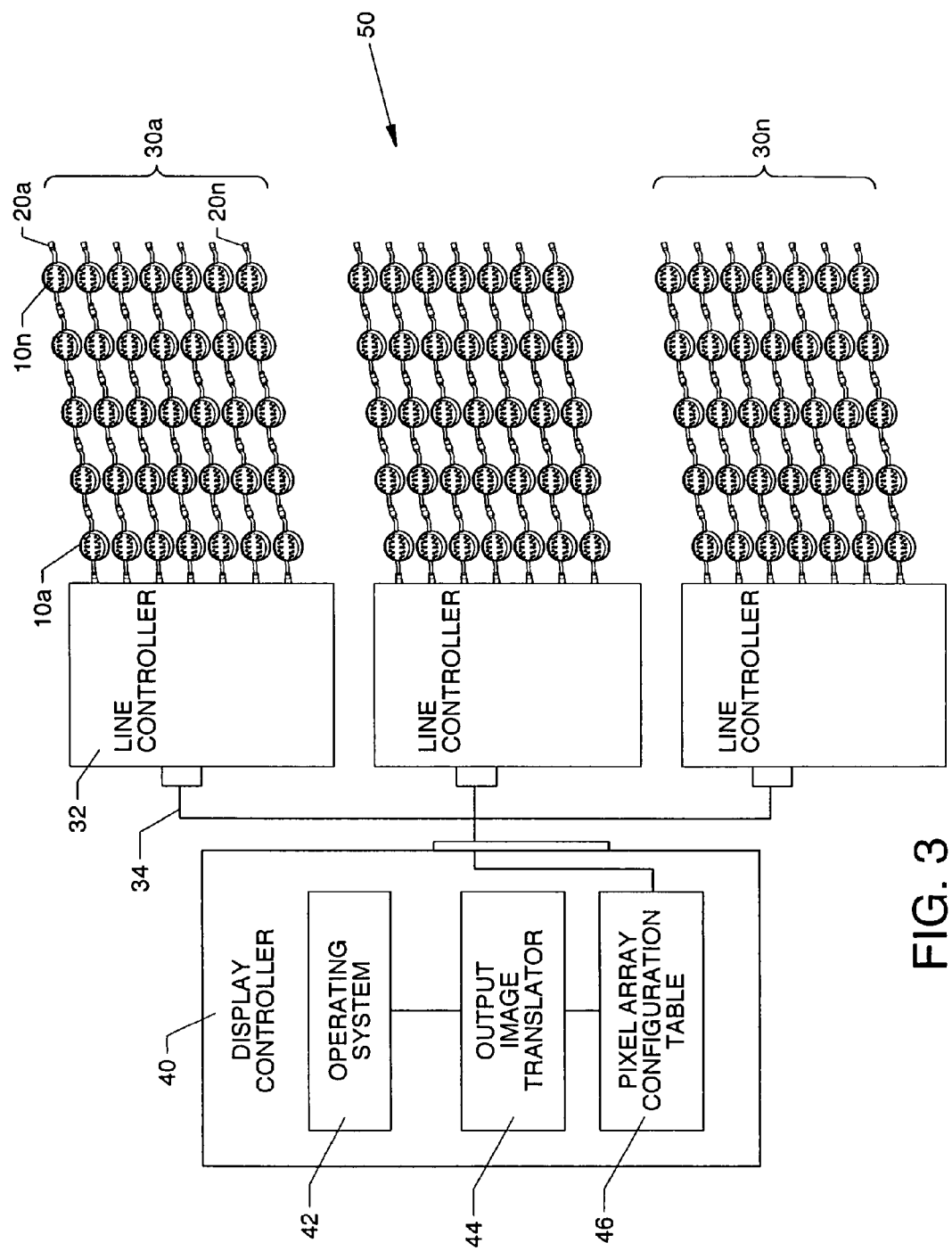
FIG. 3 is a general block diagram depicting a display system embodying a display controller, one or more line controllers, a plurality of series-connected discreet flexible pixel elements of the present invention, a plurality of flexible pixel strings, and a plurality of flexible pixel string arrays.

FIG. 3 is a general block diagram depicting discreet flexible pixel elements 10 of the present invention as applied in a display system 50. Display system 50 embodies display controller 40 which transmits visual image data and display control signals (not shown) via electronic interface 34 to a plurality of line controllers 32 operatively enabled to transmit visual image data and display control signals to a plurality of flexible pixel strings 20 embodying flexible pixel string arrays 30, which can conform to irregular shapes and surfaces in the production of large scale electronic display devices, as heretofore described.

Display controller 40 comprises operating system 42, output image translator 44, and pixel array configuration table 46. Display controller 40 operatively executes operating system 42 and output image translator 44 to convert graphical image data from a source format, typically created for use with grid-matrix and rectilinear displays and signage, into visual image data and display control signals corresponding to the logical and spatial locations of discreet flexible pixel elements 10 conformably applied to irregular shapes and surfaces, as maintained within pixel array configuration table 46. Pixel array configuration table 46 maintains logical and spatial position data for each discreet flexible pixel element 10 used in display system 50. Once output image translator 44 converts graphical image data into visual image data, display controller 40 transmits said visual image data together with display control signals to line controllers 32 via electronic interface 34. Line controllers 32 route said visual image data and display control signals to the appropriate flexible pixel string 20.

Display controller 40 may be any commercially available device capable of operatively transmitting visual image data and display control signals to line controllers 32 via electronic interface 34 such as a personal computer or workstation. Alternatively, display controller 40 may be any proprietary device capable of operatively transmitting visual image data and display control signals to line controllers 32 via electronic interface 34.

In a first preferred embodiment of display system 50, display controller 40 comprises the Daktronics® VNet® Display Controller. Details of hardware configuration, internal communications, protocols and operation of said first preferred embodiment are further described in U.S. Pat. No. 5,949,581 entitled Display System, filed Aug. 12, 1997, and U.S. Pat. No. 6,169,632 entitled Display System, filed Feb. 9, 2000. Both patents are assigned to the assignee of the present invention and are hereby incorporated into this application by reference thereto as if fully set forth herein. In a second preferred embodiment of display system 50, display controller 40 comprises the Daktronics® Venus 7000® Display Controller. Details of hardware configuration, internal communications, protocols and operation of said second preferred embodiment are further described in U.S. Pat. No. 6,819,303, entitled control system for an electronic sign (video display system), filed Aug. 17, 1998, assigned to the assignee of the present invention, and that patent is hereby incorporated into this application by reference thereto as if fully set forth herein.

Those skilled in the art will apprehend that reference to the aforesaid display controllers 40 shall not be considered limiting in scope of the types of display controllers 40 that may be embodied within display system 50.

Line controller 32 receives visual image data from display controller 40 via electronic interface 34, buffers it in internal memory (not shown) and routes it as required along with display control signals to flexible pixel strings 20. Line controller 32 may be any commercially available device operatively capable of receiving visual image data and display control signals from display controller 40 via electronic interface 34 and transmitting same to flexible pixel strings 20. Alternatively, line controller 32 may be a proprietary device produced for the same purposes. In a preferred embodiment, line controller 32 comprises the Daktronics® ProPixel® Line Controller.

FIG. 4-A and FIG. 4-B are simplified schematic diagrams depicting the internal components of discreet flexible pixel element 10 of the present invention. Referring now to FIG. 4-A, input connector 14 provides input supply voltage +VCC IN 14a and four input data and control signals CLKIN 14b (CLOCK IN), DATAIN 14c (DATA IN), LATIN 14d (LATCH IN), and OEIN 14e (OUTPUT ENABLE IN). Only input supply voltage and four input data and control lines are needed to supply operating power, image data and display control signals to operate discreet flexible pixel element 10.

Constant-current driver 100 (hereinafter designated CCD 100) is a solid-state integrated circuit (IC) device that operatively drives RGB LEDs 60-80 in accordance with visual image data and display control signals (not shown) received from display controller 40 via electrical interface 34 and line controller 32. CCD 100 is a three-channel constant-current LED driver capable of producing a wide range of driving current levels for driving RGB LEDs 60-80 as appropriate to their operational power requirements. CCD 100 controls operation of RGB LEDs 60-80 using a pulse-width-modulated (PWM) control method that allows very precise control of intensity and duration of illumination. In operation, CCD 100 performs ON/OFF switching of RGB LEDs 60-80 by color group at specified current drive levels (modulating intensity of illumination) and for specified time intervals (modulating duration of illumination) in accordance with visual image data received from display controller 40. Modulating the current drive levels to each group of RGB LEDs 60-80, in combination with modulating the time interval that each group of RGB LEDs 60-80 is illuminated, produces various patterns and colors of emitted light thereby producing visual display output and light effects. CCD 100 also re-drives output supply voltage +VCC OUT 16a and output data and control signals CLKOUT 16b (CLOCK OUT), DATAOUT 16c (DATAOUT), LATOUT 16d (LATCH OUT,) and OEOUT 16e (OUTPUT ENABLE OUT) to output connector 16. Output connector 16 operatively connects to input connector 14 of the next series-connected discreet flexible pixel element 10 thereby to supply said next discreet flexible pixel element 10 in flexible pixel string 20 with the requisite operating power, image data and display control signals. The power and data signals transmitted from CCD 100 via output connector 16 are received at input connector 14 of said next series-connected discreet flexible pixel element 10 and thereby received by CCD 100 instant as input supply voltage +VCC IN 14a and input data and control signals CLKIN 14b (CLOCK IN), DATAIN 14c (DATA IN), LATIN 14d (LATCH IN), and OEIN 14e (OUTPUT ENABLE IN). Series resistors 110 modulate the slew rate, or rate of change, of output signals CLKOUT 16b, DATAOUT 16c, LATOUT 16d, and OEOUT 16e to reduce electronic emissions and improve signal integrity over long series-connections of a plurality discreet pixel elements 10.

In a preferred embodiment, CCD 100 embodies the Allegro Microsystems, Inc. 3-Channel Constant-Current LED Driver with PWM Control, Model A6280; the apparatus, processes, functions and characteristics of said preferred embodiment of CCD 100 as described in applications manual "A6280 3-Channel Constant-Current LED Driver with PWM Control (A6280-DS Rev. 3)" provide a complete and detailed understanding of the application of said preferred embodiment and that document is hereby incorporated in its entirety by reference thereto.

Those skilled in the art will apprehend that the foregoing exposition, as well as other aspects and features of CCD 100 here unstated, including means and methods of IC device application and operational and functional details, are limiting neither in scope nor intent of the present invention. For example, the preferred embodiment heretofore described teaches LED driver means that embody a 3-channel device (e.g., CCD 100 of the preferred embodiment) that drives RGB LEDs 60-80 by color groups by channel. It will be obvious to those skilled in the art that the present invention anticipates LED driver means which embody a 5-channel device that drives RGBCM (i.e., red, green, blue, cyan and magenta color LEDs) by color groups by channel, as well as LED driver means which embody two 3-channel devices (e.g., two CCD 100 devices of the preferred embodiment) that drive RGB-CAW (i.e., red, green, blue, cyan, amber, and white color LEDs) by color groups by channel, operating by multiplexed control signal means thereof, or by patterned selection of dissimilar color LEDs with reference to a universal color space (e.g., hue-saturation-brightness), as appropriate to the uses and functions of display system 50. These and other minor differences in application of IC devices and other electrical components, and the distribution of data and control signal thereof, are anticipated herein and therefore captured by the scope and intent of the present invention.

Red LEDs 60a-60h provide light-emitting elements of discreet flexible pixel element 10 for emitting red colored light. Eight red LEDs 60a-60h are shown, but any number of red LEDs 60a-60n may be used depending on the configuration requirements of discreet flexible pixel element 10 and the operational capabilities of LED driver means as embodied by CCD 100.

Green LEDs 70a-70f provide light emitting elements of discreet flexible pixel element 10 for emitting green colored light. Six green LEDs 70a-70f are shown, but any number of green LEDs 70a-70n may be used depending on the configuration requirements of discreet flexible pixel element 10 and the operational capabilities of LED driver means as embodied by CCD 100.

Blue LEDs 80a-80f provide light emitting elements of discreet flexible pixel element 10 for emitting blue colored light. Six blue LEDs 80a-80f are shown, but any number of blue LEDs 80a-80n may be used depending on the configuration requirements of discreet flexible pixel element 10 and the operational capabilities of LED driver means as embodied by CCD 100.

Referring now to FIG. 4-B, step-down switching regulator 120 is a solid-state IC device equipped with an internal 1.4 amp power switch (not shown) that performs step-down DC/DC conversion of on-board bus voltage (+VCC) to regulated DC output voltage as required to drive RGB LEDs 60-80 (+VLED). Step-down switching regulator 120 embodies a conventional DC/DC buck regulator topology as configured with inductor 122 (L1), capacitor 124 (C3), Zener diode 126a (CR1), and Schottky diodes 126b and 126c (CR2-CR3). The use of a step-down switching regulator in conventional DC/DC buck regulator DC voltage reduction is well known and well understood in the art and the details of operation will not be reexamined here in the interest of brevity.

In operation, step-down switching regulator 120 uses current mode, high frequency switching to make and break the connection with inductor 122 (L1) at location 120a (SW). When step-down switching regulator 120 internal power switch is ON, a voltage is forced across inductor 122 (L1) due to the differential voltage at location 120b, corresponding to VIN at connection L1-1 and +VLED at connection L1-2 of inductor 122 (L1). Voltage across inductor 122 (L1) sets the bias states of diodes 126a-126c (CR1-CR3) causing current to flow in inductor 122 (L1) and across the load (RGB LEDs 60-80), charging capacitor 124 (C3), which thereby modulates current change at inductor 122 (L1) presenting a stable output voltage at +VLED. When step-down switching regulator 120 internal power switch is OFF, voltage across inductor 122 (L1) is removed causing it to discharge thereby maintaining current flow. Voltage is reversed across inductor 122 (L1) resetting the bias states of diodes 126a-126c (CR1-CR3) causing capacitor 124 (C3) to discharge in combination with inductor 122 (L1), maintaining stable output voltage at +VLED at a value set by feedback resistor network 130 (R6-R7) in accordance with the power requirements of RGB LEDs 60-80. Transient voltage suppressor 128 embodies a resistor-capacitor network that provides over-voltage protection to the inputs and outputs of CCD 100.

In a preferred embodiment, step-down switching regulator 120 embodies the Linear Technology Corporation, 500 kHz Step-Down Switching Regulator, Model LT1936; the apparatus, processes, functions and characteristics of said preferred embodiment of step-down switching regulator 120 as described in applications manual "LT1936 1.4 A, 500 kHz Step-Down Switching Regulator (LT 1006 Rev. C, undated)" provide a complete and detailed understanding of the application of said preferred embodiment and that document is hereby incorporated in its entirety by reference thereto.

Those skilled in the art will apprehend that the foregoing exposition, as well as other aspects and features of step-down switching regulator 120 here unstated, including means and methods of IC device application and operational and functional details, are well known in the art. Notwithstanding, certain advantages obtain in the application of step-down switching regulator 120 as embodied by the present invention: 1) a large DC/DC step-down power change is effected with very little power dissipation resulting in high power density (W/in$^3$) within discreet flexible pixel elements 10 enabling high component packing density resulting in a smaller overall package of discreet flexible pixel element and higher apparent resolution of electronic display devices; 2) high frequency, constant-current PWM power regulation allows for use of fewer, smaller and less expensive collateral components which generate less heat and eliminate any requirement for external cooling.

FIGS. 5-A and 5-B are a simplified circuit diagram depicting portions of two series-connected discreet flexible pixel elements 10 of the present invention. Each series-connected CCD 100 embodies internal shift register 140 and output control register 142 which drive three current regulators 144 and corresponding LED drivers. The first series-connected CCD 100a of said first series-connected discreet flexible pixel element 10a operatively receives visual image data (not shown) from line controller 32 via input connector 14 instant at input data line DATAIN 14c into said internal shift register 140a at a data transfer rate determined by input clock line CLKIN 14b clock frequency by first-in/first-out (FIFO) transfer sequence. When said internal shift register 140a of said first series-connected CCD 100a is full, CCD 100a transfers the visual image data to the next series-connected discreet flexible pixel element 10b via output connector 16 instant at output data line DATAOUT 16c. The next series-connected discreet flexible pixel element 10b receives the visual image data transmitted from said first series-connected discreet flexible pixel element 10a via input connector 14 instant, where it is received by CCD 100b at input data line DATAIN 14c instant into said internal shift register 140b in the same manner as just described. The process of data transmission of visual image data continues iteratively through to discreet flexible pixel element 10n terminus of flexible pixel string 20 (ref. FIG. 2) until display controller 40 has transmitted all requisite visual image data to internal shift registers 140a-n of CCDs 100a-n of flexible pixel elements 10a-10n, respectively.

Display controller 40 thereinafter operatively transmits a latch signal at latch-in signal line LATIN 14d via electronic interface 34 and line controller 32 to said first series-connected discreet flexible pixel element 10a, which transmits it to the next series-connected discreet flexible pixel element 10b iteratively through to discreet flexible pixel element 10n terminus of flexible pixel string 20 causing visual image data resident in internal shift registers 140a-n of each series-connected CCDs 100a-n, respectively, to transfer into output control registers 142a-n in parallel operation.

Display controller 40 thereinafter operatively transmits an output-enable signal at output-enable signal line OEIN 14e via electronic interface 34 and line controller 32 to said first series-connected discreet flexible pixel element 10a, which transmits it to the next series-connected discreet flexible pixel element 10b, iteratively through to discreet flexible pixel element 10n terminus of flexible pixel string 20, thereby to initiate operation of current regulators 144a-n which pass driving current through RGB LEDs 60-80 of each series-connected discreet flexible pixel element 10a-10n. Current regulators 144a-n of CCDs 100a-n, respectively, of discreet pixel elements 10a-10n, respectively, use the visual image data in output control register 142 to control current level (intensity of illumination) and duration of current flow (time of illumination) through RGB LEDs 60-80, thereby to produce visual display output and lighting effects from series-connected discreet flexible pixel elements 10a-10n.

It shall be understood by those skilled in the art that the forgoing exposition of operation of series-connected discreet flexible pixel elements 10 are exemplary and not exclusionary. Further details and specifics of the internal operation of CCD 100 of the preferred embodiment with regard to operating voltage, current range, clock frequency, control signal requirements, shift register size, PWM application method, signal timing, and the like, are described in application documents previously cited and herewith incorporated by reference, and will not be repeated here in the interest of brevity.

Various modifications can be made to the present invention without departing from the apparent scope thereof.

PARTS LIST 10 discreet flexible pixel element
11 printed circuit board
12 case
13 light-emitting elements
14 input connector
14a input power line (+VCC IN)
14b CLKIN (clock in) line
14c DATAIN (data in) line
14d LATIN (latch in) line
14e OEIN (output enable in) line
16 output connector
16a output power line (+VCC OUT)
16b CLKOUT (clock out) line
16c DATAOUT (data out) line
16d LATOUT (latch out) line
16e OEOUT (output enable out) line
18 flexible cable
20 flexible pixel string
30 flexible string array
32 line controller
34 electronic interface
40 display controller 42 operating system
44 output image translator
46 pixel array configuration table
50 display system
60 red LEDs
70 green LEDs
80 blue LEDs
100 constant-current driver (U1)
110 series resistors (R2-R5)
120 step-down switching regulator (U2)
120a location SW
120b location VIN
122 inductor (L1)
124 capacitor (C3)
126a Zener diode (CR3)
126b Schottky diode (CR2)
126c Schottky diode (CR1)
128 transient voltage suppressor
130 feedback resistor network
140 shift register
142 output control register
144 current regulators It is claimed:

1. A power and signal distribution system, comprising:
a plurality of flexible pixel strings each including at least two discrete flexible pixel element devices conjoined in series; and
at least one serial line controller including one or more serial line driver electronic circuits configured to supply operating power, image data, and one or more control signals to the plurality of flexible pixel strings,
wherein each of the plurality of flexible pixel strings are operatively conjoined with the at least one serial line controller thereby apportioning the plurality of flexible pixel strings into a flexible pixel string array.

2. The system of claim 1, wherein the at least one serial line controller comprises at least one printed circuit board including the one or more serial line driver electronic circuits.

3. The system of claim 1, wherein the at least two discrete flexible pixel element devices of each of the plurality of flexible pixel strings are interchangeable.

4. The system of claim 1, wherein each discrete flexible pixel element device can be interchangeably connected in series with a plurality of like discrete flexible pixel element devices to embody one of the plurality of flexible pixel strings.

5. The system of claim 1, wherein each of the plurality of flexible pixel strings is interchangeable.

6. The system of claim 1, wherein the serial line controller is an off-board serial line controller.

7. The system of claim 1, wherein each of the discrete flexible pixel element devices include at least five power and signal conductors configured to transmit operating power, image data and one or more control signals from a first discrete flexible pixel element device to a second discrete flexible pixel element device in a series transmission.

8. The system of claim 1, wherein each of the discrete flexible pixel elements devices includes:
a pixel electronics assembly, including at least one light-emitting pixel element and pixel element electronics configured to drive the at least one light-emitting pixel element;
at least one input flexible cable, including at least one input conductor electrically coupled to the pixel element electronics; and
at least one output flexible cable, including at least one output conductor electrically coupled to the pixel element electronics.

9. The system of claim 8, wherein the pixel element electronics include at least one pixel element driver configured to operatively drive the at least one light-emitting pixel element and at least one driver controller configured to operatively control the at least one pixel element driver.

10. The system of claim 8, wherein each of the discrete flexible pixel elements further comprises a power and signal distribution system configured to operatively distribute operating power, image data, and one or more control signals to the at least one light-emitting pixel element and the pixel element electronics.

11. The system of claim 8, wherein the at least one input flexible cable of each discrete flexible pixel element is configured to receive at least one of operating power, image data, and one or more control signals from the at least one serial line controller or a discrete flexible pixel element device electrically coupled to the at least one input flexible cable.

12. The system of claim 8, wherein the at least one output flexible cable of each discrete flexible pixel element is configured to distribute at least one of operating power, image data, and one or more control signals to a discrete flexible pixel element device electrically coupled to the at least one output flexible cable.

13. The system of claim 8, wherein the at least one light-emitting pixel element comprises at least one light-emitting diode.

14. The system of claim 13, wherein the pixel element electronics include a constant-current light-emitting diode driver.

15. The system of claim 8, wherein the at least one light-emitting pixel element comprises a plurality of light-emitting pixel elements of various colors.

16. The system of claim 15, wherein the various colors are selected from the group consisting of red, green, blue, cyan, magenta, and yellow.

17. The system of claim 15, wherein the plurality of light-emitting pixel elements of various colors comprises colored light-emitting diodes.

18. The system of claim 17, wherein the at least one pixel element driver comprises at least one on-board multi-channel constant-current light-emitting diode driver device with pulse-width modulate control means for driving per channel a plurality of red light-emitting diodes, per channel a plurality of green light-emitting diodes, and per channel a plurality of blue light-emitting diodes.

19. The system of claim 17, wherein the at least one pixel element driver comprises two on-board multi-channel 3-channel constant-current light-emitting diode driver devices with pulse-width modulate control means for driving per channel a plurality of red light-emitting diodes, per channel a plurality of green light-emitting diodes, and per channel a plurality of blue light-emitting diodes, per channel a plurality of cyan light-emitting diodes, per channel a plurality of magenta light-emitting diodes, and per channel a plurality of yellow light-emitting diodes.

20. The system of claim 17, wherein the at one pixel element driver comprises at least one on-board multi-channel constant-current light-emitting driver device for driving per channel a plurality of light-emitting pixel elements of various colors.

* * * * *